May 27, 1930.  L. J. THOMAS  1,760,451

PISTON

Filed Aug. 30, 1927

Inventor.
Leslie J. Thomas
by Heard Smith & Tennant.
Attys.

Patented May 27, 1930

1,760,451

UNITED STATES PATENT OFFICE

LESLIE J. THOMAS, OF ARLINGTON HEIGHTS, MASSACHUSETTS, ASSIGNOR TO VERA C. BATCHELDER, OF ARLINGTON HEIGHTS, MASSACHUSETTS

PISTON

Application filed August 30, 1927.. Serial No. 216,395.

This invention relates to a piston which has a relative reciprocation with respect to a cylinder and wherein it is essential that a close fit shall be maintained between the piston periphery and the cylinder wall. Such a piston is particularly useful in the hydrocarbon explosion engine wherein compression is high and lubrication must be maintained.

Under the conditions to which such pistons are subjected in use, it is impossible to prevent some wear taking place, as a result of which the diameter of the piston decreases and the diameter of the cylinder wall increases. Even when this wear is slight, it tends to reduce compression and permit the passage of exhaust gases past the piston, thus interfering with proper lubrication. Renewals from time to time of the usual piston rings serve more or less to offset or compensate for this wear, but eventually the entire piston has to be removed and replaced with a new and larger piston if high efficiency is to be maintained. So also, if a cylinder has to be re-bored as the result of wear, it is necessary to discard the piston and replace it with a slightly larger piston to correspond with the increase in the cylinder diameter.

Furthermore, particularly in the case of explosion engines, the end of the skirt opposite the head, if it does not snugly fit the cylinder, causes "piston slap". So also a piston which does not maintain throughout its length a snug fit in the cylinder wall results in uneven wear, causing the cylinder to become slightly out of round, slightly conical, or both.

The object of the present invention is to provide a piston of a construction such that it may be expanded in diameter within the limits due to ordinary wear and usage so that it may readily be adjusted to maintain a close fit with the cylinder and thus secure at all times a high degree of operating efficiency.

The object of the present invention is further to provide a piston of a construction such that the end opposite the head may be expanded in diameter so as to maintain a close fit with the cylinder to prevent piston slap and to insure uniform wear of the cylinder.

The nature of these and other objects of the invention will appear more fully from the accompanying description and drawings and will be particularly pointed out in the claims.

Figure 1:
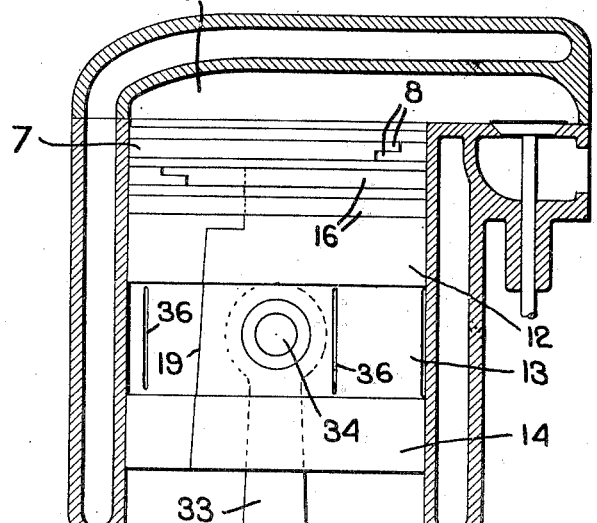
Fig. 1 is a view of a portion of the cylinder and piston of an ordinary type of hydrocarbon explosion engine with the cylinder shown in cross section and the piston in side elevation and embodying a preferred form of the present invention.
Figure 2:
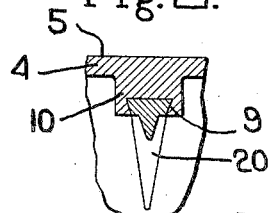
Fig. 2 is a detail in cross section taken on the line 2—2 of Fig. 3.

There is shown in Fig. 1 a portion of a simple type of a hydrocarbon engine having the cylinder 1 presenting the cylindrical wall or surface 2 to cooperate with the piston and having an explosion chamber 3 to which the hydrocarbon mixture is fed and from which it expands to propel the piston in its power stroke. But it will be understood that this particular type of motor selected is simply for the purpose of illustrating one form of the invention which in its broader aspects is available for embodiment in any piston wherein a tight fit must be maintained between the piston and the cooperating cylinder wall.

The piston in its preferred form comprises, first, a solid head against which the pressure is exerted to effect movement of the piston and, second, a cylindrical skirt divided into a plurality of segments with means for simultaneously and equally adjusting these segments in a radial direction. In the case of a motor such as that illustrated, but one piston head is required because the motive force acts only in one direction, but in its broader aspects the invention is not to be limited to a piston with a single head.

While the piston has the skirt segments bodily and radially movable, the invention in its broader aspects is not to be limited to this type of construction. One feature of the invention has to do simply with the adjustment and control of the ends of the skirt segments opposite the piston head.

In the construction illustrated, the piston head 4 presents the usual flat end surface 5 and peripheral cylrindrical surface 6. In this cylindrical surface is formed a usual piston ring groove in which is placed a suitable piston ring 7 having the usual split overlapping ends 8. The inner or lower surface of the piston head is provided with a plurality of radially undercut or dovetail grooves 9. These grooves are preferably formed in ribs 10 projecting from the lower face of the piston head. But it is to be understood that the particular construction of the piston head may be varied as desired. The end surface may be flat or not and there may be any required number of piston rings or none at all in the head proper.

The cylindrical skirt of the piston is divided longitudinally into a plurality of segments 11 herein shown as three in number. These segments are of such length as is required by the length of the piston and preferably present at the exterior three zones, 12, 13 and 14, of different thickness. In the type of piston illustrated, the surface of the zone 14 is intended to have a snug fit against the cylinder wall, the surface of the zone 13 is relieved or set back so as to form a slight clearance between it and the cylinder wall, and the surface of the zone 12 is such as to have a sliding fit with the cylinder wall.

Figure 4:
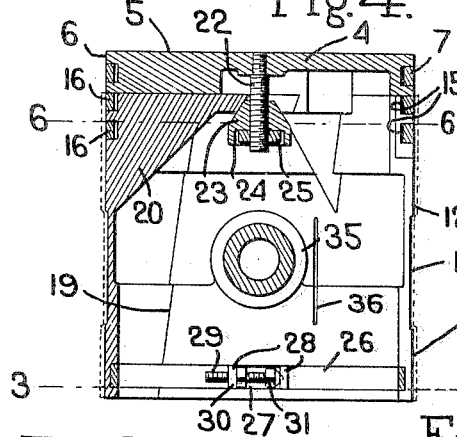
Fig. 4 is a view in axial cross section taken on the line 4—4 of Fig. 3.
Figure 5:
Fig. 5 is a detail showing the conical expander and lock nut in elevation.
Figure 3:
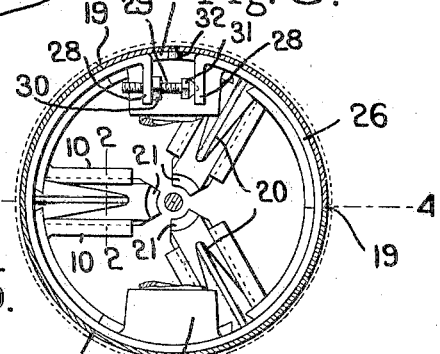
Fig. 3 is a view in transverse cross section taken on the line 3—3 of Fig. 4 and looking toward the head of the piston.
Figure 6:
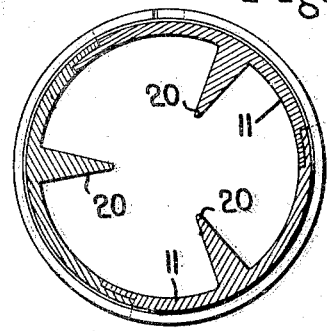
Fig. 6 is a view in transverse cross section taken on the line 6—6 of Fig. 4 showing only the parts actually sectioned and one of the piston rings.

The piston ring grooves 15, herein shown as two in number, are formed in the skirt adjacent the piston head and preferably with one wall of the groove immediately adjacent the piston head itself, as shown in Fig. 4. These grooves are fitted with suitable piston rings 16, preferably of the same type as the piston ring 7.

Figure 7:
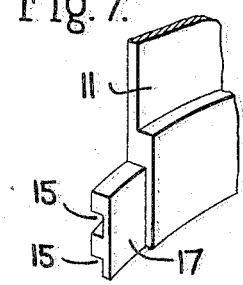
Fig. 7 is a perspective detail of a portion of one segment of the piston skirt looking toward the inner face thereof.
Figure 8:
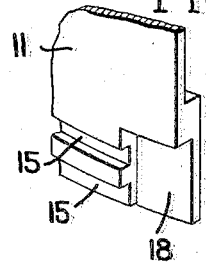
Fig. 8 is a perspective detail of a portion of another segment of the piston skirt looking toward the outer face thereof.

The segments of the skirt in that portion adjacent the head containing the piston ring grooves 15 overlap at their opposed edges, so that when the segments are expanded, the circumferential continuity of the skirt is maintained. In the construction illustrated, as shown more particularly in Figs. 7 and 8, this overlapping feature is secured by forming at this portion on one segment a circumferential projection 17 and in the adjacent segment a circumferential recess 18.

The division lines between the segments in that portion of the skirt where the segments do not overlap extend at an inclination to the longitudinal axis of the piston, as shown at 19 in Fig. 1, to assist in preventing scoring and to avoid any opening extending longitudinally of the travel of the piston.

Each segment is provided with an integral, inwardly projecting, radial fin 20 having a snug radial sliding fit in the corresponding groove 9 of the piston head so that as a result the segments have a radial sliding interlocking engagement with the piston head. The innermost ends of the segments are formed with frusto-conical, concave surfaces 21. A threaded stud 22 is secured centrally of the piston head thereto and projects inwardly and axially thereof. Upon this stud is threaded a conical expander 23 having its outer end 24 of polygonal shape to receive a wrench. A lock nut 25 is also threaded on the stud 22 and preferably within a recess in the outer end of the expander.

It will thus be seen that by turning the expander 23 on the stud 22 so as to move the expander toward the piston head, the several segments of the piston skirt will be simultaneously and equally adjusted in a radial outward direction and when in a given adjusted position, by turning down the lock nut 25, the segments will be locked in the adjusted position. Thus in assembling the piston in the cylinder, or in case of wear, or in case of re-boring the cylinder, or for any other reason, when it is necessary for the piston to be enlarged if a perfect fit is to be maintained, such a fit is secured by adjusting the expander and forcing the segments simultaneously and equally outward in a radial direction until the required fit is obtained. The minute nature of the adjustment required is such that the very slight deviation from a true circle resulting from the radial movement of a plurality of such segments is found to be immaterial. This is especially true because no change is made in the form of the piston rings which form the closest fit between the piston and the cylinder.

An important feature of the invention is the provision of means for expanding the end of a piston skirt opposite the piston head so as to insure at all times a tight fit with the cylinder walls and thus maintain a bearing between both ends of the piston and the cylinder walls. This insures equal wear of the cylinder throughout, prevents the cylinder from becoming tapered or slightly conical, and prevents "piston slap" and the wearing of the cylinder out of round. These results are secured by providing suitable means carried by the ends of the segments of the skirt opposite the piston head, which means enable the segment ends to be adjusted radially. In the construction illustrated for this purpose, an expansion ring 26 is provided seated in a circumferential groove 27 in the segments. This ring has its free ends bent inwardly at 28. An expanding screw 29 is threaded into one end 28 and abuts against the other end 28 and is provided with a lock nut 30. One portion of this screw is provided with a polygonal head 31 to receive a wrench. Thus by turning the screw 29, the ring 26 may be expanded to force the ends of the segments of the skirt opposite the piston head into close bearing engagement with the cylinder wall.

It will be noted that the screw 29 which acts to adjust the circumferential length of the ring 26 is mounted on the free ends of the ring at a substantial distance from the body of the ring. This is important because it permits the ring to contract slightly under an extreme pressure exerted radially inward on the segments. This allows for such contraction and expansion as result from heat or other causes and enables the zone 14 to adapt itself automatically to changing conditions in the cylinder, while at the same time being held with a proper bearing fit in the cylinder wall.

It is desirable that the ring 26 be prevented from moving rotarily with respect to the skirt for otherwise the inturned ends of the ring and the adjusting means for the ring might interfere with the piston rod. To prevent such rotary movement a projection is provided on the inner face of one of the segments to extend between the free ends of the ring. Such a projection is shown as a stud 32 riveted into the segment and projecting between the free ends of the ring.

An ordinary form of piston rod 33 is shown connected to a wrist pin 34 having bearings at 35 in the skirt of the piston.

Any suitable means may be provided for lubricating the piston. For this purpose there are shown slots 36 through the zonal wall 13 of the skirt so that oil splashed from the interior of the piston may enter the pocket formed between the zone 13 of the skirt wall and the cylinder wall and thus serve to lubricate the zones 12 and 14 and thus provide proper lubrication between the piston and cylinder.

Having thus described the invention, what is claimed as new, and desired to be secured by Letters Patent, is:

1. A piston comprising a solid head, a cylindrical skirt divided into a plurality of segments, means mounted on the head for simultaneously and equally adjusting the segments bodily in a radial direction.

2. A piston comprising a solid head, a cylindrical skirt divided into a plurality of segments, means mounted on the head for simultaneously and equally adjusting the segments in a radial direction adjacent the head, and means carried by the segments for adjusting them radially at their opposite ends.

3. A piston comprising a solid head, a cylindrical skirt divided into a plurality of segments and having a piston ring groove in that portion adjacent the piston head and having the segments of the said portion overlapping at their opposed edges thus to maintain the circumferential continuity of the skirt when extended, and means for simultaneously and equally adjusting the segments in a radial direction.

4. A piston comprising the construction defined in claim 3 in which the lines of division between the segments, in that portion of the skirt where the segments do not overlap, extend at an inclination to the longitudinal axis of the piston.

5. A piston comprising a solid head, a cylindrical skirt divided into a plurality of segments, the said segments having radial sliding interlocking engagement with the piston head, and means for simultaneously and equally sliding the segments in a radial direction.

6. A piston comprising a solid head, a cylindrical skirt divided into a plurality of segments, the said segments having radial sliding interlocking engagement with the piston head, and a conical expander mounted upon the head and adjustable axially thereof and engaging the segments and acting when adjusted in one direction to slide the segments outward in a radial direction simultaneously and equally.

7. A piston comprising a solid head presenting radial guiding grooves, a cylindrical skirt divided into a plurality of segments each having a fin extending centrally and radially inward therefrom and mounted to fit and slide in one of said grooves, and a conical expander mounted upon the head and adjustable axially thereof and engaging the fins and acting when adjusted in one direction to slide the fins and therewith the segments outward in a radial direction simultaneously and equally.

8. A piston comprising a solid head, a cylindrical skirt divided into a plurality of segments, the said segments having radial sliding interlocking engagement with the piston head, an axially extending threaded stud mounted in the piston head and a conical expander threaded upon the stud and engaging the segments and acting when screwed down upon the stud toward the head to slide the segments outward in a radial direction simultaneously and equally.

9. A piston comprising a solid head, a cylindrical skirt divided into a plurality of at least three substantially equal independent radially movable segments, a resilient split ring carried by the segments at the interior thereof near the ends opposite the head and engaging the inner surfaces of said segments throughout their entire width and having its free ends turned inward, and means mounted on said free ends at a substantial distance from the body of the ring for adjustably forcing said ends apart and for thereby adjusting the circumferential length of the ring to expand the skirt under sufficient tension to insure continuous engagement with the cylinder wall while permitting the ring to contract slightly under radial inward pressure on the segments.

10. A piston comprising a solid head, a cylindrical skirt divided into a plurality of independent radially movable segments, a resilient split ring carried by the segments at the interior thereof near the ends opposite the head and engaging the inner surface of said segments throughout their entire width and having its free ends turned inward, and means mounted on said free ends at a substantial distance from the body of the ring for adjustably forcing said ends apart and for thereby adjusting the circumferential length of the ring to expand the end of the skirt opposite the head while at the same time permitting the ring to contract slightly under radial inward pressure on the segments.

In testimony whereof, I have signed my name to this specification.

LESLIE J. THOMAS.